United States Patent
Lin et al.

(10) Patent No.: US 9,319,850 B2
(45) Date of Patent: Apr. 19, 2016

(54) GROUP COMMUNICATION METHOD AND SYSTEM

(71) Applicant: MOTOROLA SOLUTIONS, INC, Schaumburg, IL (US)

(72) Inventors: Lin Lin, Fox River Grove, IL (US); Michelle M Antonelli, Barrington, IL (US); Peter M Drozt, Prairie Grove, IL (US); Donald G Newberg, Hoffman Estate, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 2 days.

(21) Appl. No.: 14/109,334

(22) Filed: Dec. 17, 2013

(65) Prior Publication Data

US 2015/0172874 A1    Jun. 18, 2015

(51) Int. Cl.
| | |
|---|---|
| *H04B 7/00* | (2006.01) |
| *H04W 4/08* | (2009.01) |
| *H04W 4/10* | (2009.01) |
| *H04W 76/00* | (2009.01) |
| *H04W 76/06* | (2009.01) |

(52) U.S. Cl.
CPC .......... *H04W 4/08* (2013.01); *H04W 4/10* (2013.01); *H04W 76/005* (2013.01); *H04W 76/002* (2013.01); *H04W 76/064* (2013.01); *H04W 76/066* (2013.01)

(58) Field of Classification Search
USPC .......... 370/260–262, 310, 315, 318; 455/517–520
See application file for complete search history.

(56) References Cited

U.S. PATENT DOCUMENTS

| | | | |
|---|---|---|---|
| 7,593,359 B2 | 9/2009 | Eneroth | |
| 8,213,310 B2 | 7/2012 | Santhanam | |
| 8,401,584 B2 | 3/2013 | Miller | |
| 8,654,690 B2 * | 2/2014 | Song | 370/310 |

(Continued)

FOREIGN PATENT DOCUMENTS

| | | |
|---|---|---|
| EP | 2503839 A1 | 9/2012 |
| WO | 0230010 A1 | 4/2002 |

(Continued)

OTHER PUBLICATIONS

Corresponding International Patent Application No. PCT/US2014/069225—International Search Report with Written Opinion, mailed May 11, 2015.

*Primary Examiner* — Fayyaz Alam
(74) *Attorney, Agent, or Firm* — Daniel R. Bestor

(57) ABSTRACT

A method and system of managing group calls is disclosed. The method of comprises receiving call control signaling associated with a group of user communication entities; identifying a user communication entity of the group of user communication entities; determining a first association between the user communication entity, the first group call and at least one of a first delivery method and a second delivery method; in response to determining the first association: determining that the user communication entity is participating in a second group call; determining whether a first priority associated with the first group call and the user communication entity is higher than a second priority associated with the second group call and the user communication entity; and based on a determination that the first priority is higher, conveying to the user communication entity via the first delivery method a call control message associated with the first group call.

20 Claims, 7 Drawing Sheets

(56) References Cited

U.S. PATENT DOCUMENTS

| | | |
|---|---|---|
| 8,824,314 B2 * | 9/2014 | Ananthanarayanan et al. .............. 370/252 |
| 2008/0146203 A1 | 6/2008 | Khawand et al. |
| 2009/0252076 A1 * | 10/2009 | Song ............... 370/312 |
| 2010/0009708 A1 * | 1/2010 | Horio et al. ............ 455/518 |
| 2010/0248742 A1 * | 9/2010 | Song et al. ............ 455/456.1 |
| 2010/0255826 A1 | 10/2010 | Brewer et al. |
| 2012/0208588 A1 | 8/2012 | Blanco |
| 2013/0159521 A1 | 6/2013 | Marocch et al. |
| 2014/0066082 A1 * | 3/2014 | Anchan et al. ............ 455/452.1 |
| 2014/0135053 A1 * | 5/2014 | Brewer et al. ............ 455/519 |
| 2014/0194100 A1 * | 7/2014 | Anchan ............ 455/416 |

FOREIGN PATENT DOCUMENTS

| | | |
|---|---|---|
| WO | 2006055108 A1 | 5/2006 |
| WO | 2006019780 A3 | 8/2006 |
| WO | 2011119579 A1 | 9/2011 |

* cited by examiner

GROUP COMMUNICATION METHOD AND SYSTEM

BACKGROUND OF THE INVENTION

Push-to-talk (PTT) systems are generally half-duplex communications systems, where mobile terminals are able to communicate with each other, typically through a base station. In many cases, a network of interconnected base stations is used to connect mobile terminals across a large geographical area.

Many PTT systems enable group communication, wherein a single message or voice transmission can be transmitted to a group of users. PTT is thus popular with emergency services, as it provides an efficient means of communication to a large number of users.

It is often desirable for a device to monitor multiple talkgroups simultaneously, particularly in the case of emergency services. In particular, while different talkgroups may be allocated to fire, medical and law enforcement personnel, it is often desirable for these groups to be able to receive each others' communications. In such case, PTT talkgroups are typically monitored by scanning the talkgroups listed in a scan list, wherein priorities are allocated to talkgroups in a scan list to ensure that media from a higher priority talkgroup is played.

In the case of Land Mobile Radio (LMR) based PTT, each radio can monitor a control channel to obtain a talkgroup call status. In the case of cellular broadband based PTT, such as PTT over $3^{rd}$ Generation Partnership (3GPP) Long Term Evolution (LTE), for example, a talkgroup call can utilize a broadcast service, a unicast service or a combination thereof, depending on where individual user communication entities are located and other factors. A 3GPP LTE device can learn about broadcast talkgroup call status in an evolved Multimedia Broadcast Multicast Service (eMBMS) area through broadcast or unicast control signaling, and where unicast resources are used, through unicast control signaling.

However, a problem with cellular broadband based PTT systems of the prior art is that unicast control messages and media are generally inefficient. In particular, LTE devices generally must transition to a "connected" mode to receive the control messages or media, which reduces battery life. Furthermore, control messages and media generally utilize a relatively large amount of network resources.

Accordingly, there is a need for an improved group communication system and method.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
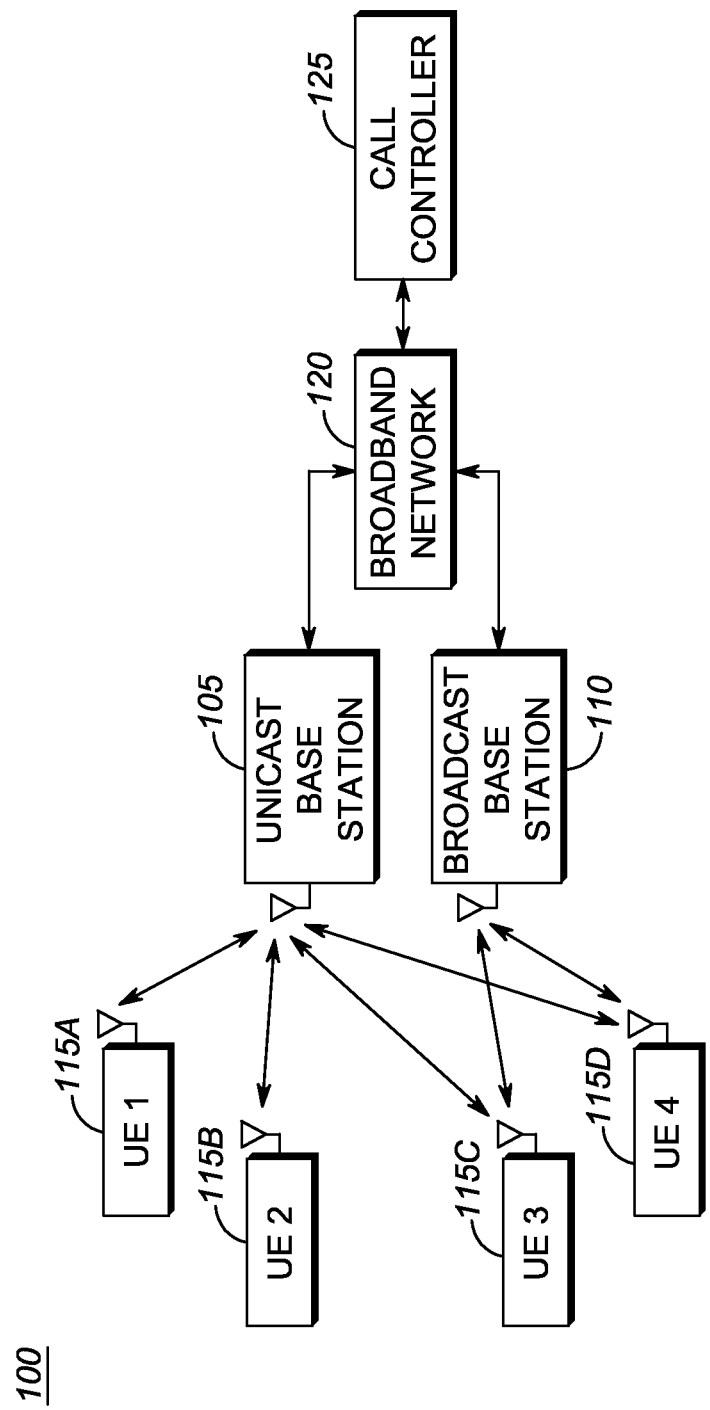
FIG. 1 is a block diagram of a group communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to one aspect, a method for managing a plurality of group calls comprises: receiving call control signaling associated with a first group call associated with a first group of user communication entities; identifying a first user communication entity of the first group of user communication entities associated with the first group call; determining a first association between the first user communication entity, the first group call and at least one of a first delivery method and a second delivery method; in response to determining the first association between the first user communication entity, the first group call and at least one of a first delivery method and a second delivery method: determining that the first user communication entity is participating in a second group call involving a second group of user communication entities; determining whether a first priority associated with the first group call and the first user communication entity is higher than a second priority associated with the second group call and the first user communication entity; and based on a determination that the first priority is higher than the second priority, conveying to the first user communication entity via the first delivery method a call control message associated with the first group call.

FIG. 1 is a block diagram of a group communication system 100, according to an embodiment of the present invention. The group communication system 100 includes one or more unicast base stations 105, one or more broadcast base stations 110, and a plurality of user communication entities in the form of a first user communication entity 115a, a second user communication entity 115b, a third user communication entity 115c and a fourth user communication entity 115d.

The one or more unicast base stations 105 and the one or more broadcast base stations 110 are connected to a broadband network 120, such as the Internet.

The one or more unicast base stations 105 can, for example, comprise one or more of $3^{rd}$ Generation Partnership (3GPP) Long Term Evolution (LTE) base stations, Wideband Code Division Multiple Access (WCDMA) base stations, Enhanced Data rates for Global Evolution (EDGE) base stations, or Wi-Fi routers. Similarly, the one or more broadcast base stations 110 can comprise one or more of 3GPP evolved Multimedia Broadcast Multicast Service (eMBMS) base stations, or Worldwide Interoperability for Microwave Access (WIMAX) base stations. As will be readily understood by a skilled addressee, the one or more unicast base stations 105 and the one or more broadcast base stations 110 can be co-located and share certain components. In particular, a single base station can comprise a unicast base station 105 and a broadcast base station 110.

The one or more unicast base stations 105 and/or the one or more broadcast base stations 110 can also be referred to as base radios, repeaters, access points, or equivalents thereof. The one or more unicast base stations 105 and/or the one or more broadcast base stations 110 generally include, for example, a repeater and a router and can also include other elements to facilitate the communications between the user communication entities and the broadband network 120.

The communications system 100 further includes a call controller 125, connected to the broadband network 120. The call controller 125 can perform various functions, discussed in further detail below, including management of group communications, particularly for user communication entities outside of broadcast coverage for one or more talkgroup calls. In particular, the call controller 125 can determine whether to use unicast or broadcast resources for a given call, and when to send a unicast transmission to a user communication entity.

The call controller 125 can be used to manage group voice calls, group video calls, or any other type of group communication. The call controller 125 can be distributed, and comprise call control modules that are interconnected using the broadband network 120. Alternatively or additionally, the call controller 125 can comprise one of a plurality of call controllers that are connected by the broadband network 120.

As will be readily understood by a person of ordinary skill in the art, further elements can be present in the communications system 100 to facilitate communication with the plurality of user communication entities. Examples of such elements include decoders, encoders and transcoders, which are configured to encode, decode and/or transcode data to one or more formats supported by the plurality of user communication entities.

The first user communication entity 115a and the second user communication entity 115b are not within a coverage area of the broadcast base station 110 and must thus receive group communications by the unicast base station 105. The third user communication entity 115c and the fourth user communication entity 115d are within coverage of the broadcast base station 110 and thus may receive group communications by the broadcast base station 110 or the unicast base station 105.

The plurality of user communication entities can each be, for example, a portable/mobile radio, a personal digital assistant, a cellular telephone, a video terminal, a portable/mobile computer with a wireless modem, or any other wireless communication device. Such devices are also referred to in the art as subscriber units (SUs), user equipment (user communication entity), mobile stations, mobile equipment, handsets, mobile subscribers, or an equivalent.

Talkgroups enable the communication system 100 to be used by different groups of users, and potentially for different purposes. As an illustrative example, a police service may communicate primarily using a first talkgroup, whereas a fire service may communicate primarily using a second talkgroup.

It is also often desirable for a user communication entity to monitor multiple talkgroups simultaneously, particularly in the case of emergency services. In particular, while different talkgroups may be allocated to a fire service and a police service, it is often desirable for these groups to be able to receive each others' communications. In such case, a plurality of talkgroups are scanned and played according to a priority, such that media of a talkgroup having a highest priority is played.

As will be readily understood by a person of ordinary skill in the art, the communications system 100 illustrated in FIG. 1 is a simplified representation of one particular communications system configuration, and many other configurations are possible.

Figure 2:
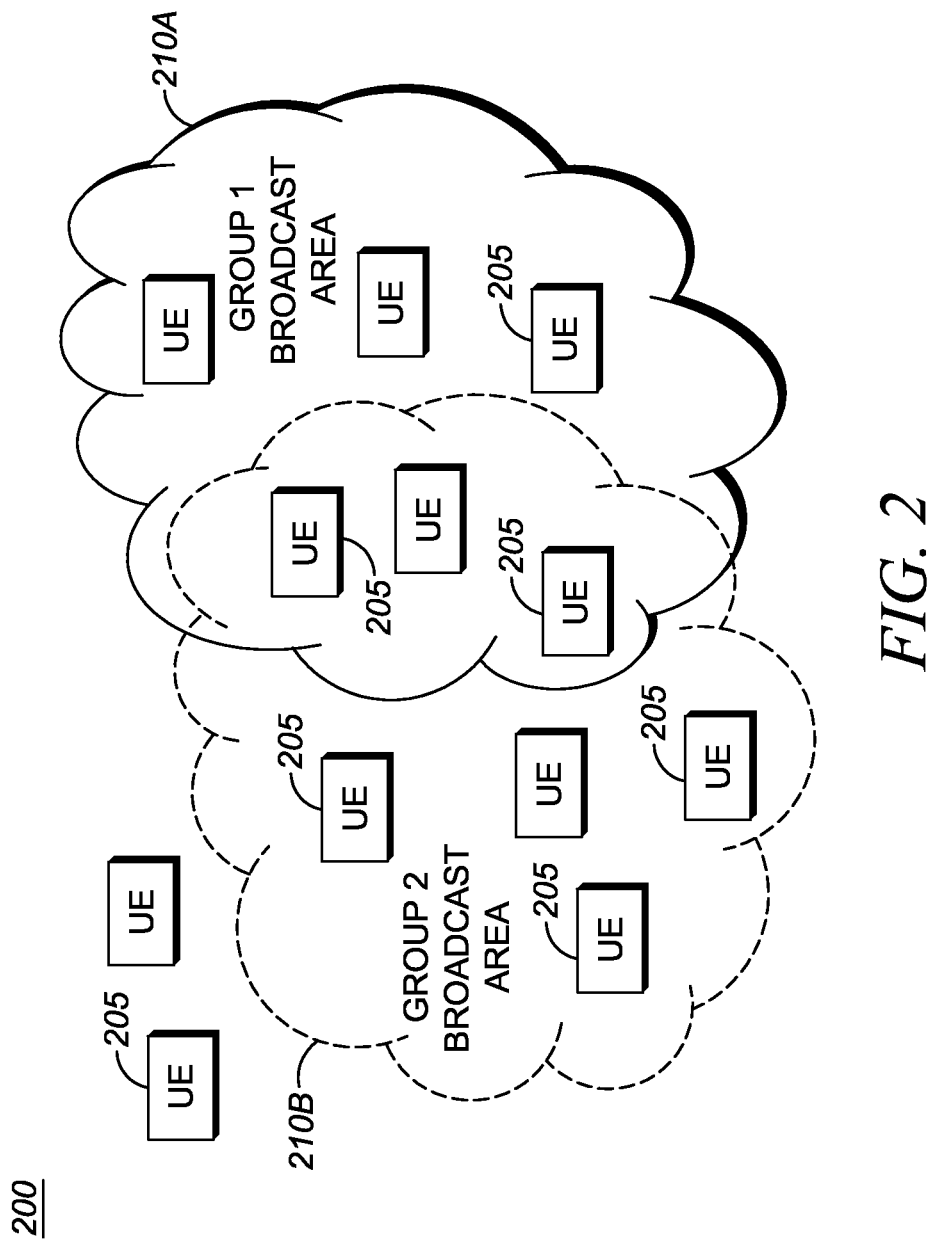
FIG. 2 is a diagrammatic illustration of a communications system, in accordance with some embodiments.

FIG. 2 is a diagrammatic illustration of a communications system 200, according to an embodiment of the present invention. The communications system 200 can be similar to the communications system 100 of FIG. 1.

The communications system 200 includes a plurality of user communication entities 205, which are able to communicate with each other, as discussed below. The plurality of user communication entities 205 can be public safety devices that, for example, enable voice data communication and/or video data communication between public safety professionals.

The communications system 200 includes a first group broadcast area 210a, for broadcast of a first group communication, and a second group broadcast area 210b, for broadcast of a second group communication. The communications system 200 also enables unicast transmission of the first group communication and the second group communication.

The first group broadcast area 210a and/or the second group broadcast area 210b can be statically defined (e.g. where eMBMS is provided in one city or area but not another). Alternatively, the first group broadcast area 210a and/or the second group broadcast area 210b can be dynamically defined based upon a location of the user communication entities 205. In such case, broadcast data transmission can be provided in areas where user communication entities 205 are concentrated.

As will be readily understood by a person of ordinary skill in the art, broadcast and unicast transmission of group communications are examples of first and second delivery methods, and the system 200 can be adapted to suit other delivery methods.

Depending on individual priorities, a user communication entity 205 can prioritize the first group communication over the second group communication, or vice versa. In particular, a fire service may wish to receive communications relating to both a fire service talkgroup and police service talkgroup, but prioritize communications of the fire service talkgroup over the police service talkgroup. A person of ordinary skill in the art will, however, readily appreciate that the call controller 125 can prioritize a first group communication over another.

As illustrated in FIG. 2, certain user communication entities 205 are in the first group broadcast area 210a, and can thus receive the first group communication via broadcast or unicast. The remaining user communication entities 205 must receive the first group communication via unicast. Similarly, certain user communication entities 205 are in the second group broadcast area 210b, and can thus receive the second group communication via broadcast or unicast. The remaining user communication entities 205 must receive the second group communication via unicast.

Each of the first group broadcast area 210a and the second group broadcast area 210b corresponds to a region defined by, for example, a coverage area of one or more eMBMS base stations. The first group broadcast area 210a and the second group broadcast area 210b can thus correspond to regions which can be adjacent, disparate or overlapping. Similarly, one or more unicast base stations can provide unicast coverage to the user communication entities 205.

A call controller (not shown), such as the call controller 125 of FIG. 1, can determine whether call control signaling/media is to be transmitted to the user communication entities 205 using unicast transmissions. This enables the communications system 200 to more efficiently utilize resources, as unicast call control messages or media need only be sent to user communication entities 205 that require such messages.

In particular, on receipt of a call control message, the call controller can determine if a user communication entity 205 can receive the call control message by broadcast, e.g. determine if the user communication entity 205 is in a broadcast reception area associated with the call control message and other factors. If the user communication entity 205 is in such a broadcast reception area, the call controller does not need to take any further action as the user communication entity 205 is able to efficiently manage call control based on broadcast reception of the call control signalling/media. If the user communication entity 205 is outside of any broadcast reception areas associated with the call control message, the call controller can selectively transmit the call control message or media to the user communication entity 205 depending on any active calls of the user communication entity 205, and a priority of the talkgroup associated with the call control message. In such case, the call controller establishes bearers and sends call control messages only to those user communication entities 205 for which a call associated with the respective call control message has a higher priority than any other calls that the user communication entity 205 is currently monitoring.

A person of ordinary skill in the art will readily appreciate that the call controller can transmit the call control message or media to the user communication entity 205 by unicast even when the user communication entity 205 is inside a broadcast reception area. In such case, the call controller can simply operate as if the user communication entity 205 was outside the broadcast reception area.

Figure 3:
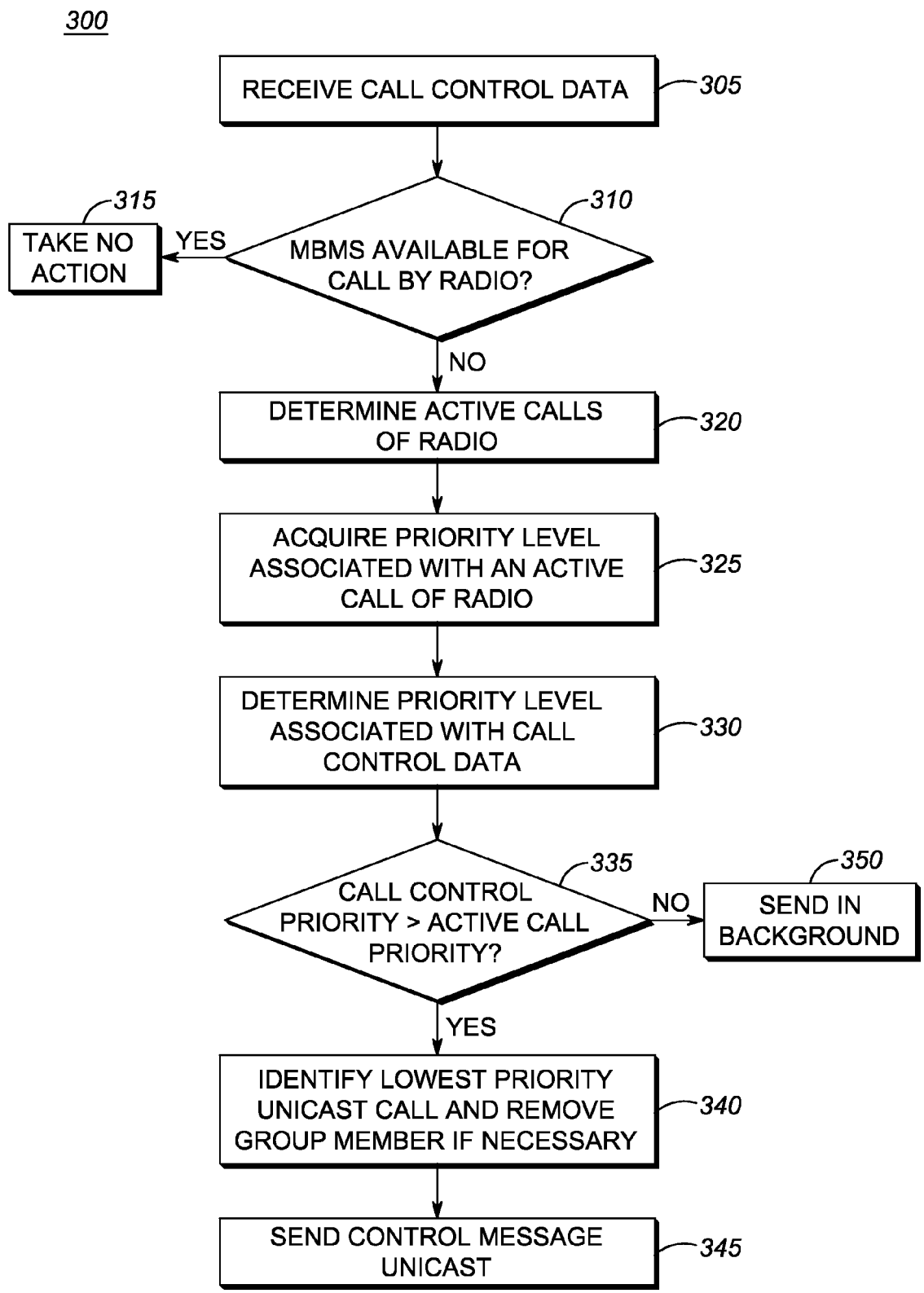
FIG. 3 illustrates a method of group call management, in accordance with some embodiments.

FIG. 3 illustrates a method 300 of group call management, according to an embodiment of the present invention. The method 300 can be operated by the call controller 125 of the communication system 100 of FIG. 1 to efficiently utilize data resources in the communication system 100. The method 300 is described with reference to a single user communication entity in the form of a user communication entity such as a user communication entity 205 of FIG. 2; however, the method 300 also can be iteratively performed on all user communication entities in a system individually, or in one or more talkgroups.

At block 305, call control signaling/media is received. The call control signaling/media is associated with a first group communication session, such as a group call, and can, for example, comprise a floor control request message.

At block 310, it is determined whether eMBMS is available, by the user communication entity, for the call control signaling/media. As discussed above, group calls, and thus associated call control signaling/media, can be made available to user communication entities on eMBMS or unicast, depending, for example, on a location of the user communication entities and an eMBMS coverage area.

If the call control signaling/media is available over eMBMS, no further action is taken for the user communication entity and the method 300 concludes at block 315. In such case, the user communication entity is able to autonomously detect active eMBMS call data and efficiently manage call prioritization itself based thereon.

If eMBMS is not available for the call control signaling/media by the user communication entity, any active calls of the user communication entity are determined in block 320.

In one embodiment, the active calls are determined using knowledge of a scan list of the user communication entity and associated priorities, and calls that are active on the system. In another embodiment, the active calls are explicitly provided by the user communication entity to a call controller.

At block 325, a priority level associated with an active call of the user communication entity is determined. According to certain embodiments, the user communication entity is able to receive several active calls simultaneously. In such case, the priority level is a priority associated with an active call that has a lowest priority of all active calls.

At block 330, a priority level of a talkgroup associated with the call control signaling is determined for the user communication entity. As discussed above, different user communication entities can have different priorities for the same call control signaling/talkgroup. As an illustrative example, a police service radio can give higher priority to a police talkgroup than a fire talkgroup, whereas a fire service radio can give a higher priority to a fire talkgroup than a police talkgroup. Accordingly, the priority of the talkgroup can be determined based upon one or more of a number of factors, including a desired priority, an incident state and an emergency status.

The priority level of the talkgroup can be determined according to one or more rules associated with the user communication entity. In such case, the call controller and the user communication entity can independently determine the priority level of the talkgroup, depending on whether the call control signaling/media is provided over eMBMS or unicast.

At block 335, it is determined whether the priority of the talkgroup is greater than the priority of the active call(s). If the priority of the talkgroup is greater than the priority of the active call, at block 340 an active call associated with a lowest priority is identified and removed from an active call list of the user communication entity (if necessary), and the control message is sent to the user communication entity by unicast at block 345. Calls are removed from the active call list when it is known that the user communication entity will end such calls. As will be readily understood by a person skilled in the art, a unicast bearer may also be established at block 335 to facilitate communication of the control message.

If the priority of the talkgroup is lower than the priority of the active call, then the call control message is sent in the background at block 350. In such case, a plurality of call control messages can be sent to the user communication entity, without necessarily being sent in real time, for example periodically, and for future use, or at the start of the corresponding group communication session.

This enables the call control signaling/media to be sent in real time or near real time only to those user communication entities for which the talkgroup has a higher priority than at least one other call in which the user communication entity is currently actively participating.

According to certain embodiments (not shown), the method further comprises determining if the user communication entity is "joined" to (or affiliated with) the talkgroup associated with the call control signaling. A Session Initiation Protocol (SIP) session, for example, may be in place between the UE and the server for each group with which the user communication entity is "joined", and thus the presence of a SIP session can be used as an indication of whether the user communication entity is joined to a talkgroup.

When the user communication entity is not joined to the talkgroup, the call control message is sent in the background, as described above with reference to block 350. The user communication entity may choose not to join a talkgroup because, for example, it has a very low priority or is a talkgroup that is seldom used by the user communication entity.

Figure 4A:
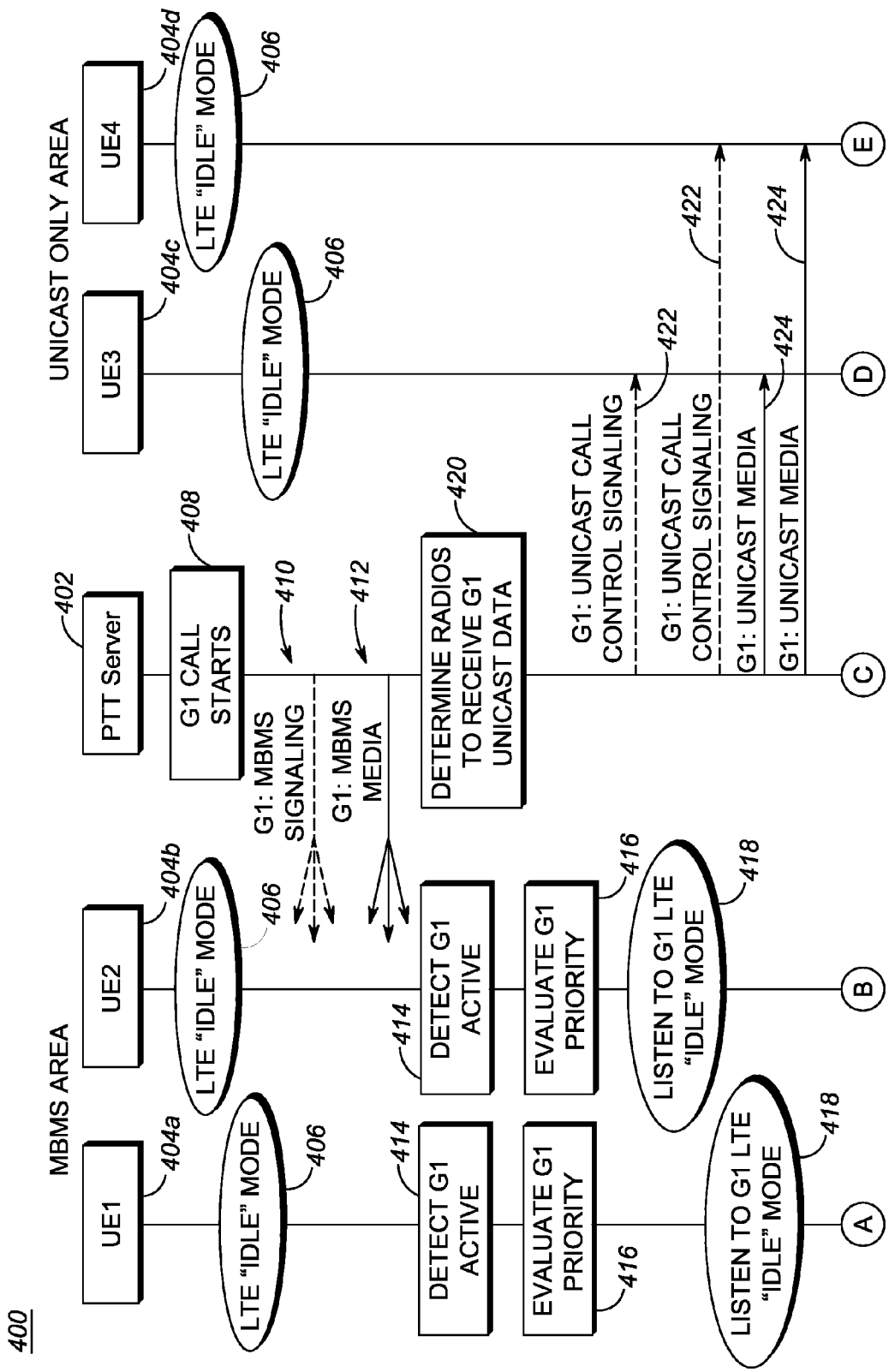
FIG. 4A is a diagrammatic illustration of an exemplary process flow of a system, in accordance with some embodiments.
Figure 4B:
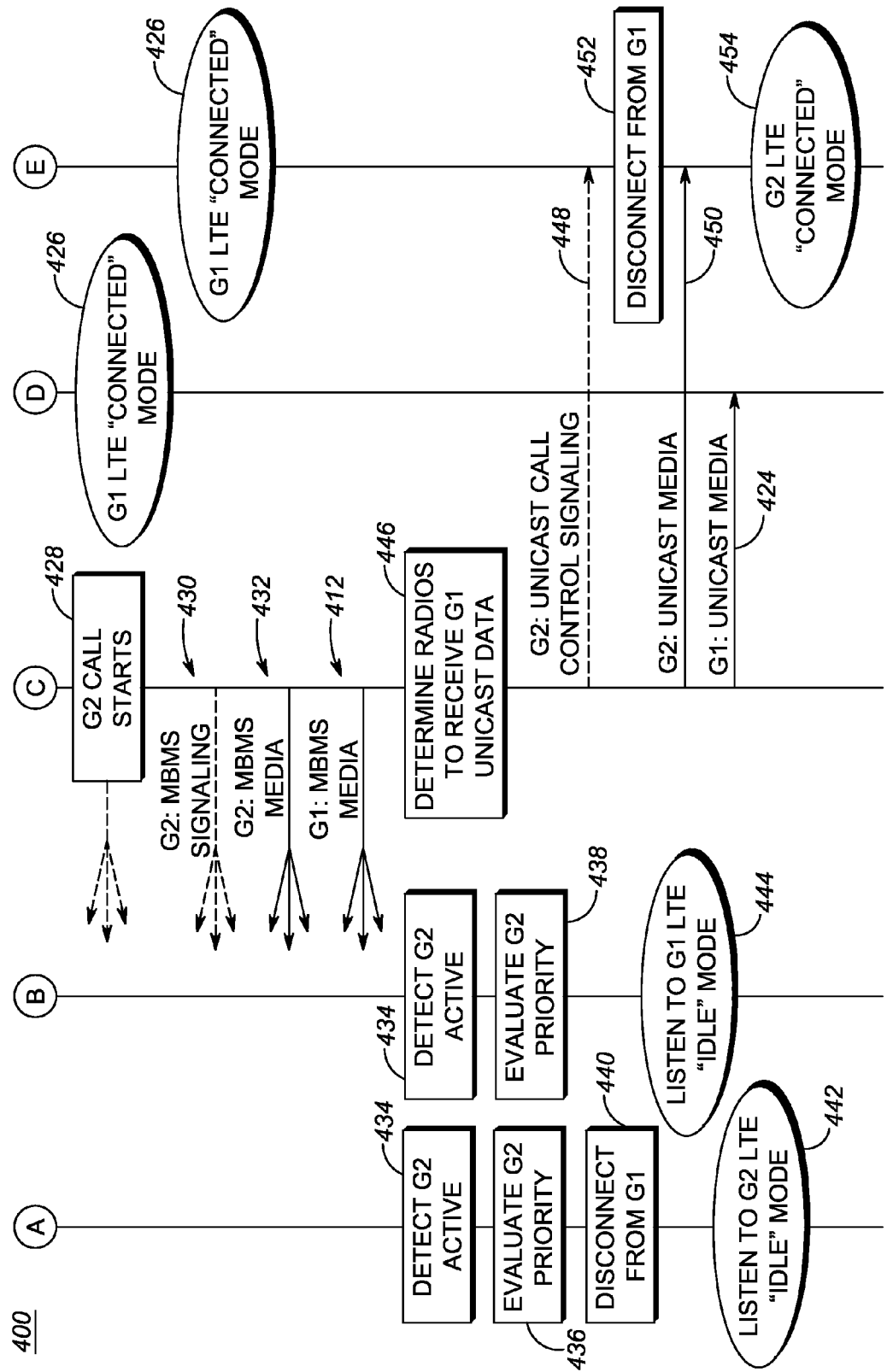
FIG. 4B is a continuation of the diagrammatic illustration of FIG. 4A depicting an exemplary process flow of a system, in accordance with some embodiments.

FIGS. 4A and 4B depict a diagrammatic illustration of an exemplary process flow 400 of a system according to an embodiment of the present invention.

The system includes a PTT server 402, a first user communication entity 404a, a second user communication entity 404b, a third user communication entity 404c and a fourth user communication entity 404d. The first user communication entity 404a and the second user communication entity 404b are in an eMBMS area for first and second group calls G1, G2 and the third user communication entity 404c and fourth user communication entity 404d are in a unicast only area for the first and second group calls G1, G2.

The PTT server 402 can provide voice, video and/or other data to the first user communication entity 404a, the second user communication entity 404b, the third user communication entity 404c and the fourth user communication entity 404d, depending on one or more talkgroups of the respective user communication entities 404a-d. Examples of PTT standards implemented by the PTT server 402 can include an Open Mobile Alliance (OMA) PTT over Cellular (OMA-PoC) standard, a voice over IP (VoIP) standard, and a PTT over IP (PoIP) standard.

Initially, the first user communication entity 404a, the second user communication entity 404b, the third user communication entity 404c and the fourth user communication entity 404d are not receiving any data, and in particular not any unicast data. The first user communication entity 404a, the second user communication entity 404b, the third user communication entity 404c and the fourth user communication entity 404d are thus in LTE IDLE mode as illustrated by states 406. LTE IDLE mode refers to a mode of an LTE user communication entity where the user communication entity is not actively connected to a base station for transmission or reception of data, but is able to receive incoming connections via a paging mechanism. LTE IDLE mode enables the user communication entity to remain in a low power mode when not actively receiving unicast data, while still being able to receive such data when needed.

At block 408, a first group call G1 starts. As discussed above, a group call can, for example, comprise various types of media including audio and/or video. Corresponding signaling and media is broadcast in the eMBMS area in the form of Group 1 eMBMS signaling 410 and Group 1 eMBMS media 412.

Subsequently, both the first user communication entity 404a and the second user communication entity 404b detect that group call G1 is active in blocks 414 and evaluate a priority of the first group call G1 in blocks 416. As neither of the first user communication entity 404a and the second user communication entity 404b are listening to any group communications, both of the first user communication entity 404a and the second user communication entity 404b start to listen to G1 on eMBMS, as illustrated in states 418. As the first user communication entity 404a and the second user communication entity 404b listen to the first group call G1 on eMBMS, they are able to stay in IDLE mode for LTE and thus reduce battery consumption.

In block 420, the PTT server 402 then determines which of the first user communication entity 404a, the second user communication entity 404b, the third user communication entity 404c, and the fourth user communication entity 404d should be provided with the first group call G1 by unicast. This can, for example, be performed using part of the method 300 of group call control of FIG. 3.

In block 420, it is also determined that the third user communication entity 404c and the fourth user communication entity 404d should receive the first group call G1 by unicast. Corresponding signaling and media is thus transmitted to the third user communication entity 404c and the fourth user communication entity 404d in the form of Group 1 unicast call control signaling 422 and Group 1 unicast media 424. As illustrated by states 426, the third user communication entity 404c and the fourth user communication entity 404d then receive G1 over unicast LTE, and are thus in LTE connected mode.

The unicast call control signaling 422 can comprise a session start indication. Furthermore, the unicast call control signaling 422 can comprise an indication to participate in the first group communication session and an indication to leave another group communication session, if needed.

At block 428, a second group call G2 starts, upon which corresponding signaling and media is broadcast in the eMBMS area in the form of Group 2 eMBMS signaling 430 and Group 2 eMBMS media 432. The Group 1 eMBMS media 412 is sent in parallel to the Group 2 eMBMS media 432 as both the first and second group calls are available in the eMBMS area.

Subsequently, both the first user communication entity 404a and the second user communication entity 404b detect that group call G2 has started in block 434 and evaluate a priority of G2 in blocks 436 and 438 respectively. In this case, the first user communication entity 404a gives the second group call G2 a higher priority than the first group call G1, and the second user communication entity 404b gives the first group call G1 a higher priority than the second group call G2. Accordingly, the first user communication entity 404a stops monitoring the first group call G1 in 440, and starts monitoring the second group call G2. As such, the first user communication entity 404a is listening to G2 while in LTE IDLE mode, whereas the second user communication entity 404b is listening to G1 while in LTE IDLE mode, as illustrated by states 442 and 444 respectively.

The PTT server 402 then determines which of the first user communication entity 404a, the second user communication entity 404b, the third user communication entity 404c, and the fourth user communication entity 404d should receive the second group call G2 by unicast, in block 446, where it is determined that the fourth user communication entity 404d should receive the second group call G2 by unicast. As discussed above, this can, for example, be performed using part of the method 300 of group call control of FIG. 3. Corresponding signaling and media is transmitted to the fourth user communication entity 404d in the form of Group 2 unicast call control signaling 448 and Group 2 unicast media 450.

The fourth user communication entity 404d is also disconnected from G1 in 452, and resultantly is connected to only G2 in LTE connected mode, as illustrated by state 454.

A person of ordinary skill in the art will readily appreciate that the similar process flows can be used to enable a user communication entity to transfer from a broadcast call to a higher priority unicast call, or from a unicast call to a higher priority broadcast call.

Figure 5:
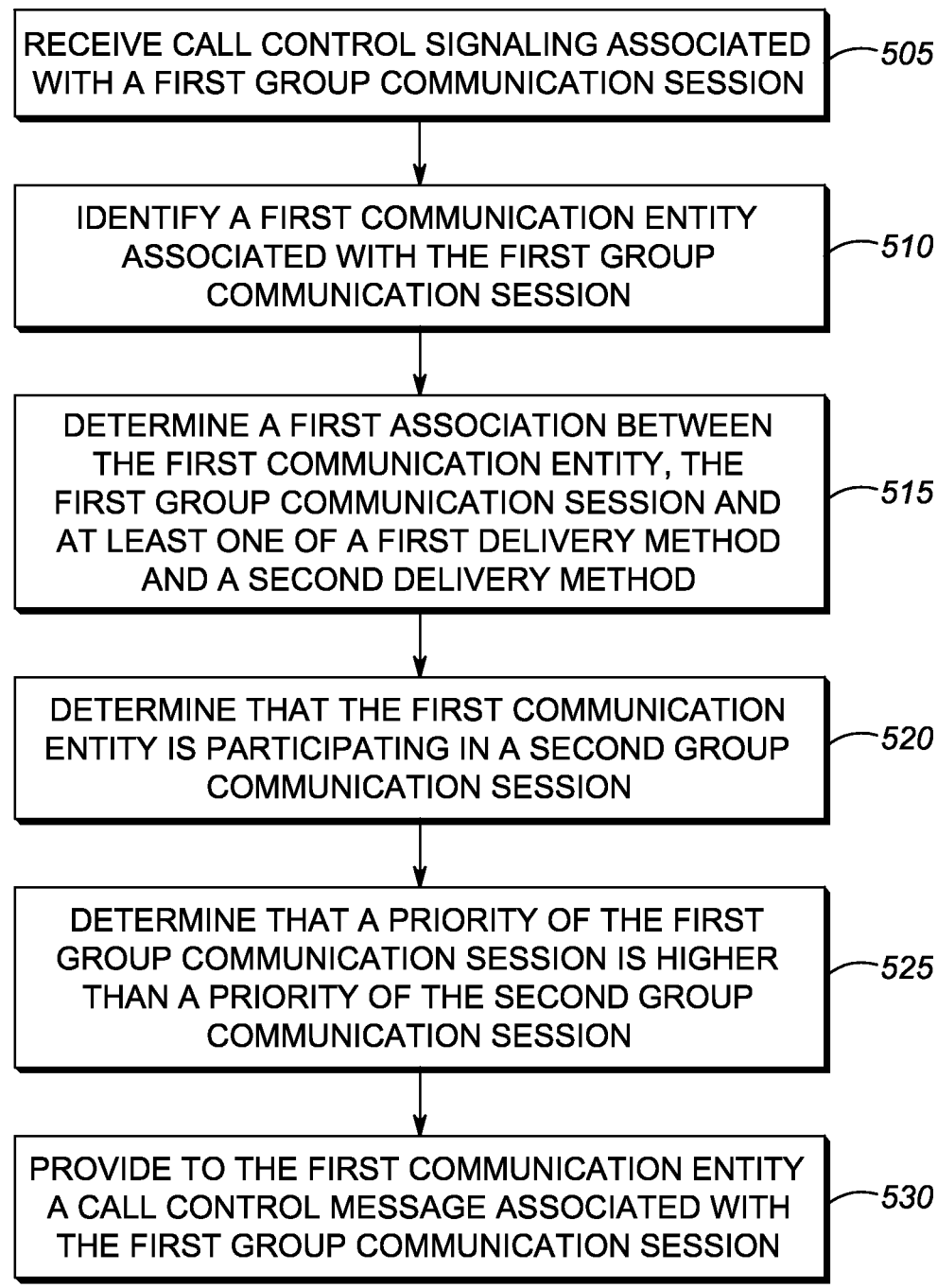
FIG. 5 illustrates a method of group communication, in accordance with some embodiments.

FIG. 5 illustrates a method 500 for managing a plurality of group communication sessions, according to an embodiment of the present invention. The method 500 can, for example, be operated by the call controller 125 of the communication system 100 of FIG. 1 to efficiently facilitate data communication of a group of user communication entities in a first communication network and a second communication network.

At block 505, call control signaling is received. The call control signalling is associated with a first group communication session associated with a first group of user communication entities. According to certain embodiments, the call control signaling includes group call data, such as media relating to the call.

At block 510, a first user communication entity of the first group of user communication entities associated with the first group communication session is identified.

At block 515, a first association between the first user communication entity, the first group session and at least one of a first delivery method and a second delivery method is determined. For example, a first association between the first user communication entity, the first group session and at least one of a first delivery method can be that the first user communication entity is unable to receive the group session by the first delivery method, and can be determined according to a location of the first user communication entity and a coverage area of a network.

At block 520, it is determined that the first user communication entity is participating in a second group communication session involving a second group of user communication entities.

At block 525 it is determined that a first priority associated with the first group communication session and the first user communication entity is higher than a second priority associated with the second group communication session and the first user communication entity.

At block 530, a call control message is conveyed to the first user communication entity, for example via the first delivery method, based on the determination that the first priority is higher than the second priority.

The method 500 enables, for example, call control signaling/media to be provided by broadcast transmission to all users that are able to receive it, and by unicast transmission to selected users based upon a priority of the talkgroup. This in turn enables more efficient utilization of unicast network resources, which can also result in reduced power consumption for certain user communication entities.

Figure 6:
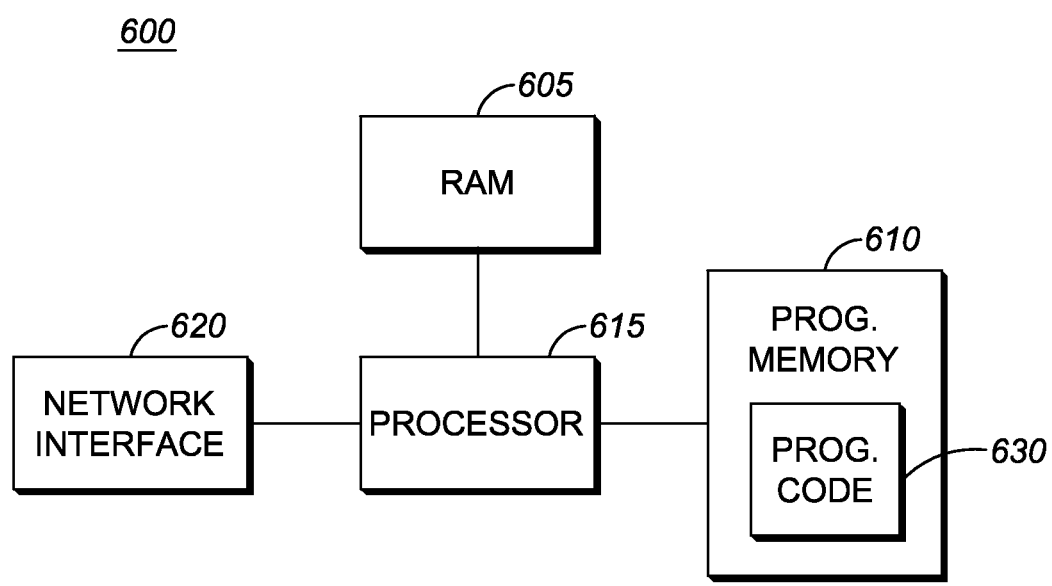
FIG. 6 is a block diagram of a call controller, in accordance with some embodiments.

FIG. 6 is a block diagram of a call controller 600, according to an embodiment of the present invention. The call controller 125 of FIG. 1 and PTT server 402 can be similar or identical to the call controller 600. Similarly, one or more steps of the methods 300, 500 of FIGS. 3 and 5 can be implemented via the call controller 600.

The call controller 600 comprises a random access memory (RAM) 605 and a programmable memory 610 that are coupled to a processor 615. The processor 615 also has ports for coupling to one or more network interfaces 620. The one or more network interfaces 620 can be used to enable the call controller 600 to communicate with other devices in a network, such as a base station or a user device.

The programmable memory 610 can store operating code (OC) for the processor 615 and code for performing functions associated with call management. For example, the programmable memory 610 can store computer readable program code components 630 configured to cause execution of a method, such as the method 300 of FIG. 3 and/or the method 500 of FIG. 5, as described herein.

The call controller 600 can further comprise any additional elements necessary for the call controller 600 to perform additional desired functions.

The call controller 600 can comprise a collection of appropriately interconnected units or devices, wherein such units or devices perform, together, functions that are equivalent to the functions performed by the elements depicted in FIG. 6.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing a plurality of group calls, the method comprising:
   receiving call control signaling associated with a first group call associated with a first group of user communication entities;
   identifying a first user communication entity of the first group of user communication entities associated with the first group call;
   determining one or more available delivery methods for the first user communication entity in association with the first group call, wherein the one or more available delivery methods comprises at least one of a first delivery method and a second delivery method; and
   in response to determining the one or more available delivery methods:
      determining that the first user communication entity is participating in a second group call involving a second group of user communication entities via an existing delivery method;
      determining whether a first priority associated with the first group call for the first user communication entity is higher than a second priority associated with the second group call for the first user communication entity;
      when the first priority is higher than the second priority, determining to deliver, to the first user communication entity, the call control signaling associated with the first group call via a delivery method of the one or more delivery methods;
      when the second priority is higher than the first priority, determining to deliver, to the first user communication entity, the call control signaling associated with the first group call via any delivery method, of the one or more delivery methods, that does not convey higher priority than the existing delivery method; and
      conveying, to the first user communication entity and via the determined delivery method, a call control message associated with the first group call.

2. The method of claim 1, wherein the one or more available delivery methods is a first one or more available delivery methods and wherein the method further comprises:
   identifying a second user communication entity of the first group of user communication entities associated with the first group call;
   determining a second one or more available delivery methods for the second user communication entity in association with the first group call, wherein the second one or more available delivery methods is different from the first one or more delivery methods; and
   conveying to the second user communication entity, via a delivery method of the second one or more available delivery methods, a call control message associated with the first group call, wherein the delivery method used to convey the call control message to the second user communication entity is different than the delivery method used to convey the call control message to the first user communication entity.

3. The method of claim 1, wherein the first delivery method is a unicast delivery method.

4. The method of claim 1, wherein the second delivery method is a broadcast delivery method.

5. The method of claim 1, wherein the first delivery method and the second delivery method are on different networks.

6. The method of claim 1, wherein the one or more available delivery methods comprises a background update.

7. The method of claim 1, wherein the call control message associated with the first group call comprises an indication to leave the second group call.

8. The method of claim 1, wherein the call control message associated with the first group call comprises an indication to participate in the first group call.

9. The method of claim 1, wherein the existing delivery method is a first existing delivery method and wherein the method of claim 1 further comprises:
   identifying a second user communication entity of the first group of user communication entities associated with the first group call;
   determining a second one or more available delivery methods for the second user communication entity in association with the first group call, wherein the second one or more available delivery methods comprises one or more of the first delivery method and the second delivery method; and
   in response to determining the second one or more available delivery methods:
      determining that the second user communication entity is participating in another group call involving another group of user communication entities via a second existing delivery method;
      determining whether a priority associated with the first group call and the second user communication entity is higher than a priority associated with the another group call and the second user communication entity; and
      based on the determination that the first priority associated with the first group call and the second user communication entity is not higher than the priority associated with the another group call and the second user communication entity and no delivery method in the second one or more delivery methods conveys lower priority than the second existing delivery method, adding the first group call to a background update associated with the second user communication entity.

10. The method of claim 9, further comprising conveying the background update to the second user communication entity.

11. The method of claim 10, further comprising conveying the background update to the second user communication entity one or more of periodically and at the start of the first group call.

12. The method of claim 9, further comprising:
deleting a third group call from the background update, wherein the third group call is associated with a lower priority than the first priority.

13. The method of claim 1, wherein the call control signaling associated with the first group call comprises a session start request.

14. The method of claim 1, wherein priorities of the first group call and the second group call are contained in a scan list associated with the first user communication entity.

15. A system for managing a plurality of group calls, the system comprising:
a network interface, for providing data to a plurality of user communication entities via each of a first delivery method and a second delivery method;
a processor coupled to the network interface; and
a memory coupled to the processor, the memory including instruction code executable by the processor for:
receiving call control signaling associated with a first group call associated with a first group of user communication entities;
identifying a first user communication entity of the first group of user communication entities associated with the first group call;
determining one or more available delivery methods for the first user communication entity in association with the first group call, wherein the one or more available delivery methods comprises at least one of a first delivery method and a second delivery method; and
in response to determining the one or more available delivery methods:
determining that the first user communication entity is participating in a second group call involving a second group of user communication entities via an existing delivery method;
determining whether a first priority associated with the first group call for the first user communication entity is higher than a second priority associated with the second group call for the first user communication entity; and
when the first priority is higher than the second priority, determining to deliver, to the first user communication entity, the call control signaling associated with the first group call via a delivery method of the one or more delivery methods;
when the second priority is higher than the first priority, determining to deliver, to the first user communication entity, the call control signaling associated with the first group call via any delivery method, of the one or more delivery methods, that does not convey higher priority than the existing delivery method; and
conveying to the first user communication entity and via the first data interface and the determined delivery method, a call control message associated with the first group call.

16. The system of claim 15, wherein the first delivery method routes data to user communication entities via a first data network and the second delivery method routes data to user communication entities via a second data network.

17. The system of claim 15, wherein the system is implemented in a call controller.

18. The method of claim 2, wherein conveying to the second user communication entity, via a delivery method of the second one or more available delivery methods, a call control message associated with the first group call comprises:
determining a priority associated with the second user communication entity and the first group call and a priority associated the second user communication entity and a different group call; and
determining a delivery method of the second one or more available delivery methods for delivery of the call control message to the second user communication entity based on the determined priority associated with the second user communication entity and the first group call and the determined priority associated the second user communication entity and the different group call.

19. The method of claim 1, further comprising:
receiving, by the first user communication entity, the call control message associated with the first group call; and
determining, by the first user communication entity, the first priority associated with the first group call based on the delivery method used to convey the call control message associated with the first group call.

20. The system of claim 15, further comprising the first user communication entity and wherein the first user communication entity is configured to:
receive the call control message associated with the first group call; and
determine the first priority associated with the first group call based on the delivery method used to convey the call control message associated with the first group call.

* * * * *